United States Patent [19]

Van Berkel

[11] Patent Number: 4,787,235

[45] Date of Patent: Nov. 29, 1988

[54] METHOD FOR MANUFACTURING A STACK OF SUPPORTING PLATES

[76] Inventor: Cornelis E. Van Berkel, Staringlaan 27, 1422 BG Uithoorn, Netherlands

[21] Appl. No.: 79,119

[22] Filed: Jul. 29, 1987

[30] Foreign Application Priority Data

Aug. 6, 1986 [NL] Netherlands ............................ 8602014

[51] Int. Cl.$^4$ ...................... B21D 28/26; B21D 31/00; B21D 53/20
[52] U.S. Cl. ....................................... 72/379; 10/86 B; 10/86 F; 411/521
[58] Field of Search ................... 10/86 R, 86 B, 86 F; 72/363, 373, 377, 379, 333, 336, 339; 206/338, 501, 503, 526; 222/143; 411/442, 443, 521

[56] References Cited

U.S. PATENT DOCUMENTS

| 3,116,542 | 1/1964 | Niekamp | 29/163.5 |
| 3,479,979 | 11/1969 | Dunn | 113/121 |
| 3,510,170 | 7/1970 | Wilson | 72/325 |

FOREIGN PATENT DOCUMENTS

| 1273667 | 9/1961 | France. |
| 1588097 | 4/1970 | France. |
| 2520947 | 8/1983 | France. |
| 608080 | 12/1978 | Switzerland. |
| 1520851 | 8/1978 | United Kingdom. |

Primary Examiner—E. Michael Combs
Attorney, Agent, or Firm—Webb, Burden, Ziesenheim & Webb

[57] ABSTRACT

Washer or supporting plate with means preventing the sticking together of the washers in a magazine. Said means are formed by protrusions. The method for manufacturing the washers as well as the device make the protrusions such that in the stack they are staggered with respect to the protrusions of a preceding and a next washer.

9 Claims, 3 Drawing Sheets

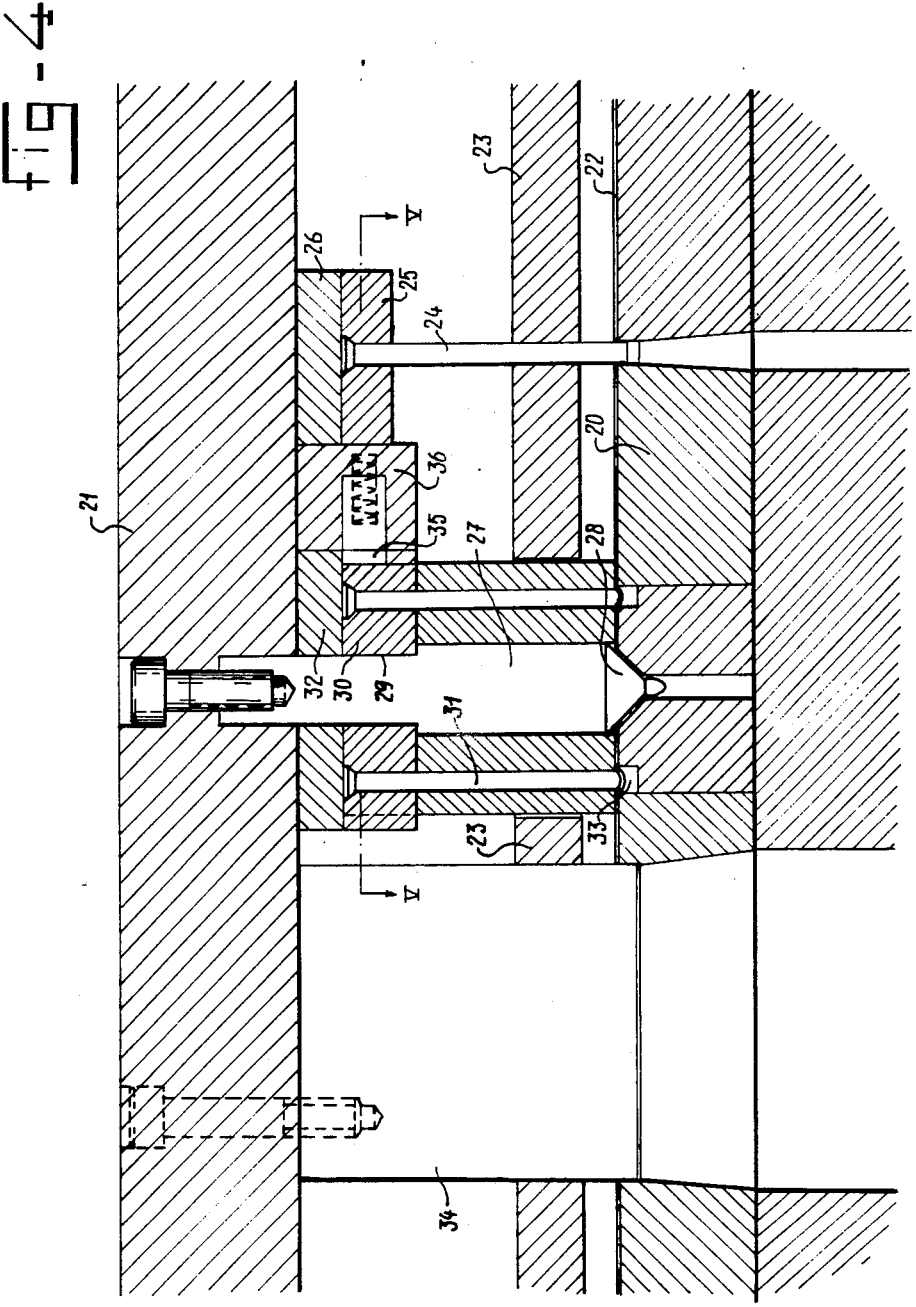

METHOD FOR MANUFACTURING A STACK OF SUPPORTING PLATES

The invention relates in the first instance to a method for manufacturing washer or supporting plates, identical to each other in shape and dimensions, by punching said plates out of a large plate, at least one hole with a sloping edge pressed through towards one side of the supporting plate being punched in each supporting plate during the manufacture thereof.

Such a method is generally known. The washer or supporting plates obtained therewith are, for example, used for fixing, in combination with screws, insulation materials on an under layer such as a roofing sheet. They can, however, also be used for other purposes. The devices with which said washer or supporting plates are fitted have a magazine in which there is a stack of said supporting plates and said devices are provided with means with which the lowermost plate in the stack is in each case extracted from the magazine and is brought to the place where mating can take place with a fixing means such as a screw.

In this connection the problem arises that the supporting plates stick to each other in the magazine as a result of grease and/or moisture or through burr formation as a result of wear of the punching device. This is the cause of breakdowns.

The object of the invention is therefore to provide a method with which washer or supporting plates can be obtained in which the problems mentioned earlier no longer occur.

This object is achieved according to the invention in the first place in that each supporting plate is provided during the manufacture with at least three indentations at a distance from the hole or the holes which produce protrusions to one side and in each subsequent supporting plate said indentations, viewed in the circumferential direction of the supporting plate, are provided at a distance from the indentation in the preceding plate in a manner such that, when several supporting plates are stacked, the protrusions of each plate lie outside the region of the indentations of a preceding or subsequent plate. The protrusions ensure that the supporting plates are held at a distance from each other in the magazine. If three protrusions are used, a stable three-point support is obtained which is staggered for each supporting plate with respect to the preceding plate, as a result of which a stable stack is obtained in the magazine and a stack which can be transferred without any difficulties from a packaging to the magazine.

Instead of three protrusions, which, incidentally may have any desired shape, it is, of course, also possible to provide four, five or more protrusions. However, three protrusions already provide, in a simple manner, the required stability. Said protrusions must preferably amount to more than 10% of the distance over which the pressed-through hole edge projects outside the plane of the plate in order to reliably prevent sticking at the position of the pressed-through hole edges.

The protrusions may be directed in the same direction as the pressed-through hole edge but may also be oppositely directed. They may be spherical or linear and they are preferably symmetrically arranged, for example according to the pattern of an equilateral triangle around the central hole with the pressed-through edge intended for countersunk reception of a screw head.

The invention also relates to a device for carrying out a method according to the invention. A device is known which consists of a punching device with a support for a large plate, means for the step-wise advance of the plate, and in the direction of advance, first of all a punch which can be moved up and down for punching a hole, then a punch which can be moved up and down for pressing the hole edge through and then a punch which can be moved up and down for cutting the supporting plate provided with a hole out of the large plate.

Said device is now modified according to the invention in that around the punch for pressing the hole through, there are provided at least three forming punches for making the indentations, which forming punches are mounted in a ratchet wheel which is rotatable around the centre line of the embossing punch and which interacts with an element which rotates the ratchet wheel through an angle during each return stroke of the punching device. The result is thereby achieved that, during each stroke of the punching device, the forming punches are moved through an angle, which angle can have any desired dimension provided the protrusions in one plate do not fall into the protrusions of a preceding plate. Preferably, an angle is maintained between 15° and 25° and, in particular, an angle of 20°.

The invention will now be explained in more detail on the basis of the drawings.

FIG. 4 shows the punching device for manufacturing the supporting plates diagrammatically in section.

Figure 1:
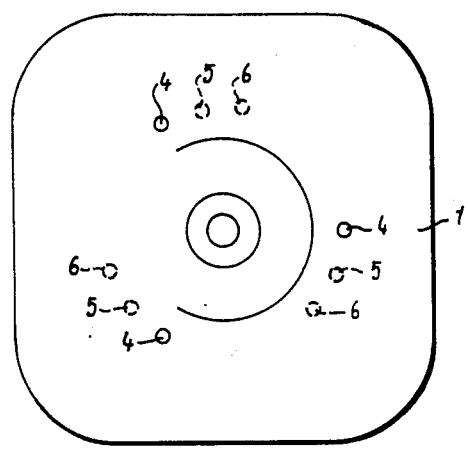
FIG. 1 shows a plan view of a supporting plate obtained with the method according to the invention.
Figure 2:
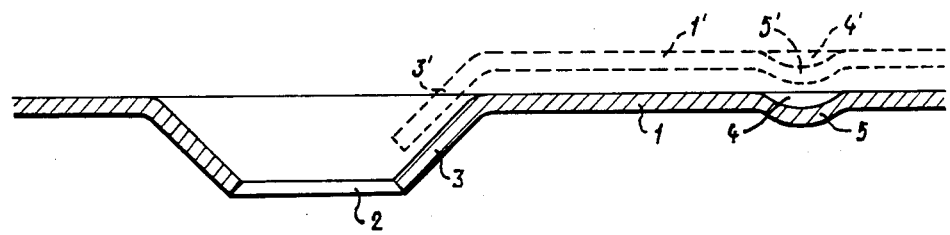
FIG. 2 is a section through a part of the plate of FIG. 1 on a larger scale.

FIG. 1 shows a square washer plate 1 with rounded corners which is provided with a central hole 2 having an edge 3 pressed through in a sloping manner, as can be more clearly seen in FIG. 2.

In said plate three indentations 4 are provided which result in the protrusion 5 shown in FIG. 2. These protrusions are provided regularly around the central hole 2 at a mutual angle of 120°.

5 indicates where the indentations, and consequently also the protrusions, of a plate situated in the stack under the plate 1 are located and 6 shows the indentations of the plate located in turn thereunder. The protrusions of each plate consequently always rest on a flat face section of a preceding plate if a stack of plates is fitted in a magazine which ensures that the plates are always situated with the side edges in the same plane.

Figure 3:
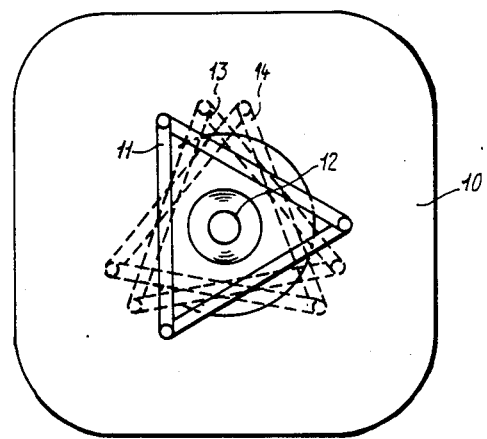
FIG. 3 shows a variant of the plate of FIG. 1.

FIG. 3 shows a plate 10 which is provided with linear indentations 11 which define a closed equilateral triangle and are symmetrical with respect to the central hole 12.

Here, too, 13 and 14 respectively indicate where the indentations are located in plates situated under the plate 10.

The linear indentations do not, of course, have to form a complete triangle. Linear indentations of shorter length are easier to manufacture.

With a plate thickness of 0.75 mm, the protrusion in the embodiment shown in FIG. 2 amounts also to 0.75 mm. The pressed-through hole edge 3 has a spacing of 3.2 mm from the inside edge of the hole to the top face of the plate 1.

FIG. 2 shows by means of broken lines the position of a subsequent plate 1' in which the indentation above the indentation 4 is shown but which is in reality staggered therefrom as shown in FIG. 1. With the dimensions shown, the protrusion should amount to at least 0.3 mm in order to prevent adhesion nevertheless occurring at the position of the indentations 3 and 3'.

FIG. 4 shows a punching device provided with a bottom plate or bottom knife 20 and a top plate 21 which can be moved up and down. This is moved up and down in a known manner by means of a cylinder.

The top face 22 of the bottom plate 20 forms the bearing face for a plate out of which the washer or supporting plate has to be punched.

Above this plate there is a stripper 23 which ensures that during the return stroke the plate remains free of the punches.

The top plate carries a punch 24 mounted in a punch holder 25 with head plate 26. Said punch 24 cuts a central hole in the plate in the manner as shown.

At 27 the top plate carries a punch 28 by means of which the hole made by the punch 24 is pressed through into the shape shown in FIG. 2.

Mounted rotatably on the shank 29 of said punch 27 is a ratchet wheel 30 in which four forming punches 31 are mounted which are again held in their place by a head plate 32. Said punches are used to make the indentations or protrusions at the position of the cutters 33.

Next thereto, on the left, there is, on the top plate 21, the cutting knife 34 with which the periphery of the plate shown in FIG. 1 or 3 respectively is cut out.

During each downward stroke of the punching device three operations are consequently performed simultaneously in three consecutive surface sections of a large plate, viz. the punching of the central hole, the pressing through of the hole edge of an already manufactured hole and the cutting out of the plate.

Figure 5:
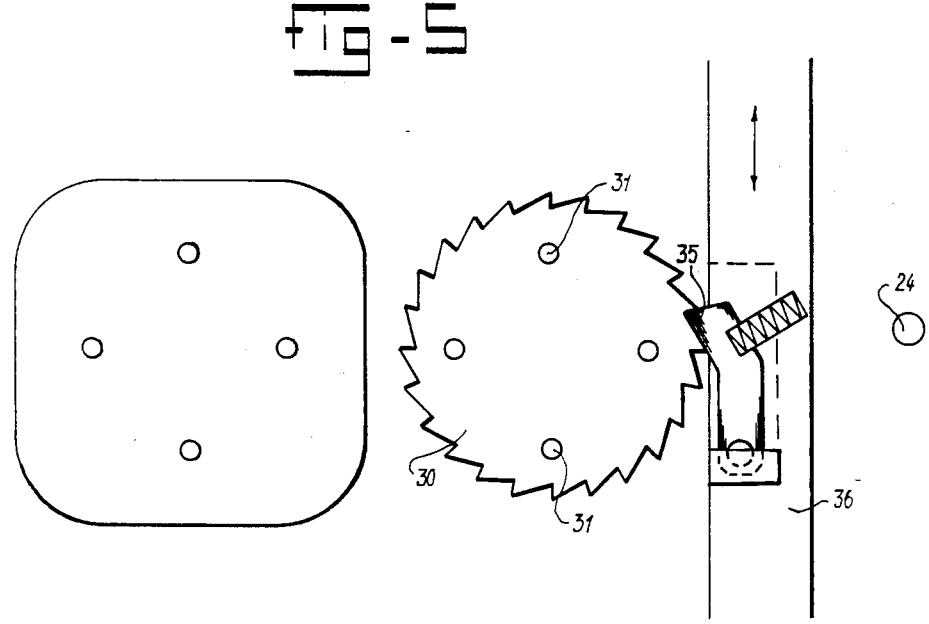
FIG. 5 shows diagrammatically a section along the line V—V in FIG. 4.

FIG. 5 shows the ratchet wheel 30 and a spring-loaded catch 35 interacting therewith which is mounted in a rod 36 which can be moved to and fro horizontally and which is moved to and fro by a cylinder, not shown, which receives an instruction during the rising stroke of the punching device.

I claim:

1. Method for manufacturing a stack of supporting plates, wherein all of said plates are identical and have at least one flat side edge, and said plates in the stack are placed with the flat side edges in a common plane, said plates being made by pressing them out of a large plate; punching a central hole in each plate such that the central hole of each plate has a sloping edge formed therein which in the stack extends downwardly a distance beyond the lower surface of each plate and centers the plates in the stack; forming by punch means at least three indentations in each plate extending out of the plane of the plate, said indentations spaced-apart from each other and from the central hole; and rotating the punch means a fixed angular distance after each indentation forming to form angularly staggered sets of said at least three indentations in successively formed plates step, and stacking the formed plates whereby, after stacking, the indentations on a superjacent plate in the stack engage flat surface areas of a subjacent plate of the stack to thereby provide a non-nested stack of said formed plates.

2. Method according to claim 1 wherein the angular rotation of the punch means after each indentation forming step is between about 15° to about 25°.

3. Method according to claim 2 wherein the angular rotation is about 20°.

4. Method according to claim 1, characterized in that the indentations are provided in the same direction as the sloping edge of the central hole.

5. Method according to claim 1 or 4, characterized in that each of the indentations define a spherical protrusion.

6. Method according to claim 5, characterized in that the spherical protrusions lie at the vertices of an equilateral triangle with the central hole in the center thereof.

7. Method according to claim 1 or 4, characterized in that each of the indentations define a linear protrusion.

8. Method according to claim 7, characterized in that the linear protrusions form a closed equilateral triangle with the central hole located in the center thereof.

9. Method according to claims 1 or 4, characterized in that each of the protrusions amounts to more than 10% of the distance to which the sloping edge of the central hole projects out of the plane of the plate.

* * * * *